(12) United States Patent
Cox (10) Patent No.: US 9,802,652 B1
(45) Date of Patent: Oct. 31, 2017

(54) REMOVABLE MUD FLAP

(71) Applicant: TeraFlex, Inc., West Jordan, UT (US)

(72) Inventor: Christopher Paul Cox, West Jordan, UT (US)

(73) Assignee: TeraFlex, Inc., West Jordan, UT (US)

( * ) Notice: Subject to any disclaimer, the term of this patent is extended or adjusted under 35 U.S.C. 154(b) by 0 days.

(21) Appl. No.: 15/338,185

(22) Filed: Oct. 28, 2016

(51) Int. Cl.
*B62D 25/18* (2006.01)
*B62D 25/16* (2006.01)

(52) U.S. Cl.
CPC ......... *B62D 25/182* (2013.01); *B62D 25/166* (2013.01)

(58) Field of Classification Search
CPC ..... B62D 25/18; B62D 25/182; B62D 25/166
See application file for complete search history.

(56) References Cited

U.S. PATENT DOCUMENTS

| | | | | |
|---|---|---|---|---|
| 3,954,281 A * | 5/1976 | Juergens | ............... | B62D 25/188 280/851 |
| 4,354,690 A * | 10/1982 | Hanson | ................ | B62D 25/168 280/851 |
| 4,453,728 A * | 6/1984 | Verge | ..................... | B62D 25/18 16/305 |
| 5,833,254 A * | 11/1998 | Bucho | .................. | B62D 25/188 280/154 |
| 6,484,984 B2 * | 11/2002 | Hawes | ................. | B62D 25/188 248/217.3 |
| 8,783,727 B2 * | 7/2014 | Flaman | ................ | B62D 25/182 280/851 |
| 9,045,174 B2 * | 6/2015 | Dixon | .................. | B62D 25/182 |
| 9,643,657 B2 * | 5/2017 | West | .................... | B62D 25/166 |
| 2013/0256483 A1 * | 10/2013 | Dixon | .................. | B62D 25/182 248/222.14 |
| 2013/0282235 A1 * | 10/2013 | Kamminga | ............. | B60B 39/00 701/36 |
| 2014/0042736 A1 * | 2/2014 | Flaman | ................ | B62D 25/182 280/851 |

\* cited by examiner

*Primary Examiner* — Erez Gurari
(74) *Attorney, Agent, or Firm* — Christensen O'Connor Johnson Kindness PLLC (57) ABSTRACT

A mud flap assembly is suitable for use with a vehicle. The mud flap assembly includes a rod assembly that is configured to be mounted to the vehicle. The rod assembly has an elongate housing and a stop extending from the housing. The mud flap assembly further includes a mud flap. A keyway extends through a portion of the mud flap. A first part of the keyway is sized and configured to rotatably engage the elongate housing. A second part of the keyway engages the stop to limit rotation of the mud flap between a first position and a second position. The mud flap also includes biasing element that biases the mud flap toward the first position when the mud flap is in the second position.

20 Claims, 10 Drawing Sheets

REMOVABLE MUD FLAP

BACKGROUND

Mud flaps are installed behind the wheels of vehicles to prevent the discharge of water, mud, rocks, and other debris from the rear of the vehicle. Mud flaps are often mounted the fender or other portions of the vehicle body; however, for vehicles with open wheels, such as heavy duty trucks and trailers, or large wheel wells, there is often not a suitable body component to which the mud flap can be mounted. For such vehicles, a support is sometimes mounted to the vehicle frame. The support often takes the form of a rod extending laterally from the vehicle frame, with the flap being mounted to the rod.

Known mud flap assemblies have many drawbacks. The mud flaps must be rigid to maintain the mud flap in a preferred position while being able to absorb the impact of road debris. The mud flaps must also be durable to prevent premature failure under demanding operating conditions. It is also desirable that the mud flaps be easily installed and removed. Thus, there is a need for a mud flap assembly that is functional, durable, and easily installed and removed.

SUMMARY

A first representative embodiment of a disclosed mud flap assembly is suitable for use with a vehicle. The mud flap assembly includes a rod assembly that is configured to be mounted to the vehicle. The rod assembly has an elongate housing and a stop extending from the housing. The mud flap assembly further includes a mud flap. A keyway extends through a portion of the mud flap. A first part of the keyway is sized and configured to rotatably engage the elongate housing. A second part of the keyway engages the stop to limit rotation of the mud flap between a first position and a second position. The mud flap also includes biasing element that biases the mud flap toward the first position when the mud flap is in the second position.

A second representative embodiment of a disclosed mud flap assembly is suitable for use with a vehicle. The mud flap assembly includes a mount that can be coupled to the vehicle, in different positions. The mud flap assembly also includes a rod assembly that can be coupled to the mount. The rod assembly has a cylindrical housing with a stop extending radially from an outer surface of the housing. A mud flap is rotatably mounted to the rod assembly. The mud flap has a keyway extending through a portion of the mud flap. A first part of the keyway is sized and configured to receive the housing of the rod assembly. A second part of the keyway limits rotation of the mud flap. The mud flap also has a biasing element that biases the mud flap toward a first position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

Figure 1:
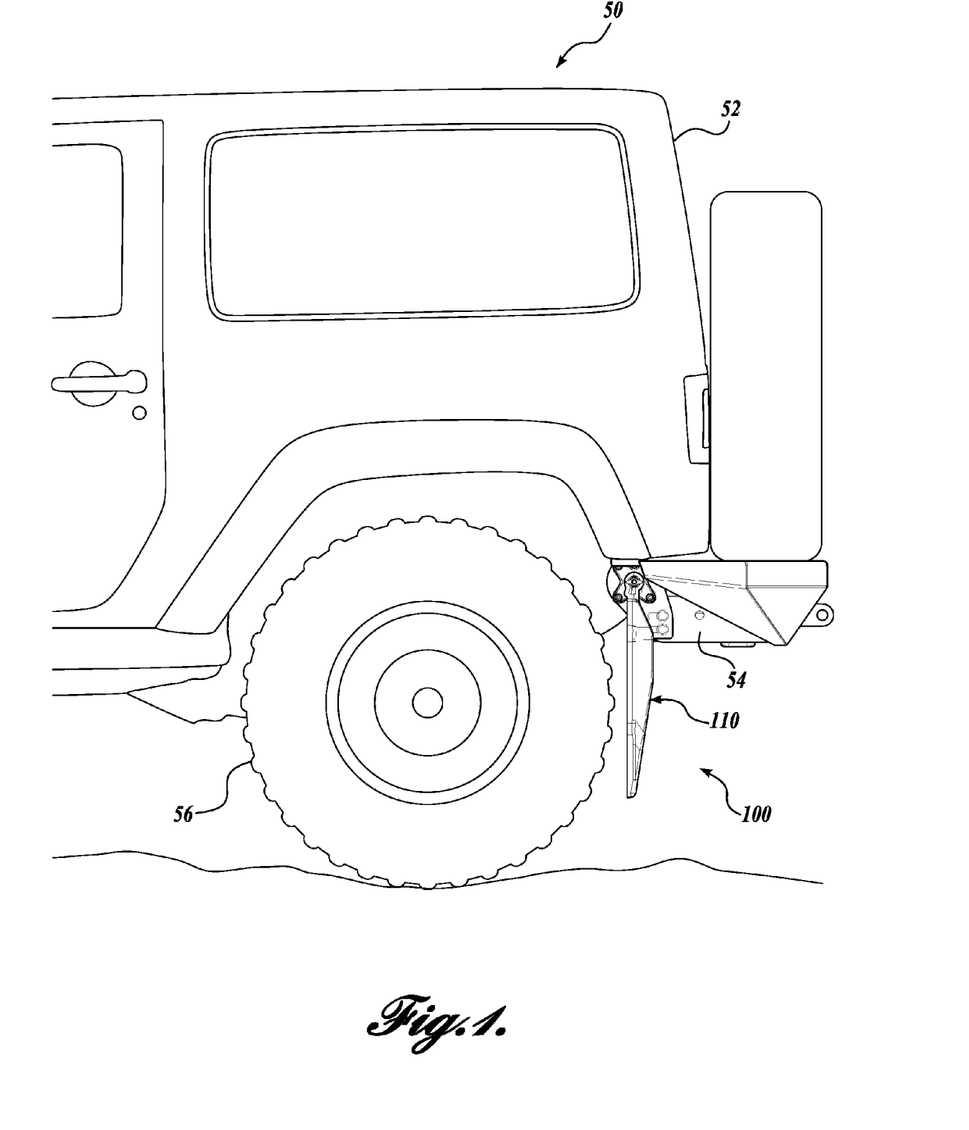
FIG. 1 shows a partial side view of a vehicle with a representative embodiment of a mud flap assembly according the present disclosure.

FIG. 1 shows an example of a vehicle 50 suitable with a representative embodiment of a disclosed mud flap assembly 100. The vehicle 50 includes a body 52 mounted to a frame 54, which is supported by a plurality of tires 56. The illustrated mud flap assembly 110 is mounted to the vehicle 50 so that the mud flap assembly 100 is positioned rearward of the tire 56 and extends downward from the vehicle frame 54. More specifically, the mud flap 100 is preferably positioned to block mud, water, rocks, and other debris that would otherwise be discharged rearwardly by the tire 56 when the vehicle 50 is in motion.

The illustrated embodiment shows a mud flap assembly 100 mounted behind the rear driver-side tire 56 of an off-road vehicle 50. It will be appreciated that the mud flap assembly 100 may also be used on various other types of vehicles, including but not limited to cars, buses, heavy duty vehicles, such as class 8 trucks, trailers, or any other vehicle known to utilize mud flaps. In addition, the mud flap assembly 100 may be utilized at each tire location or at only some of the tire locations. These and other variations of the use of the disclosed mud flap assemblies 100 on different vehicles and in different configurations are contemplated and should be considered within the scope of the present disclosure.

Figure 2:
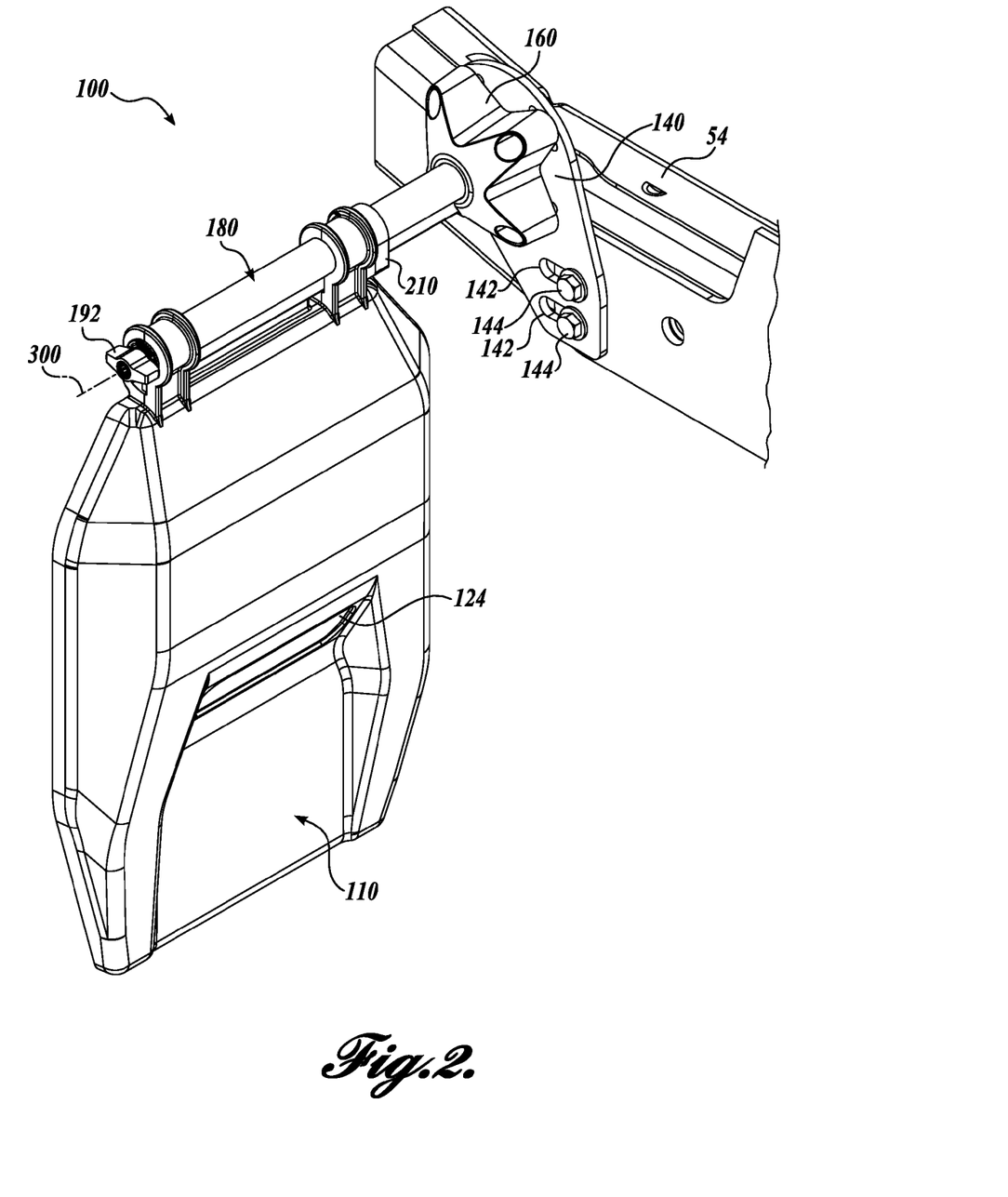
FIG. 2 shows a top rear isometric view of the mud flap assembly of FIG. 1.
Figure 3:
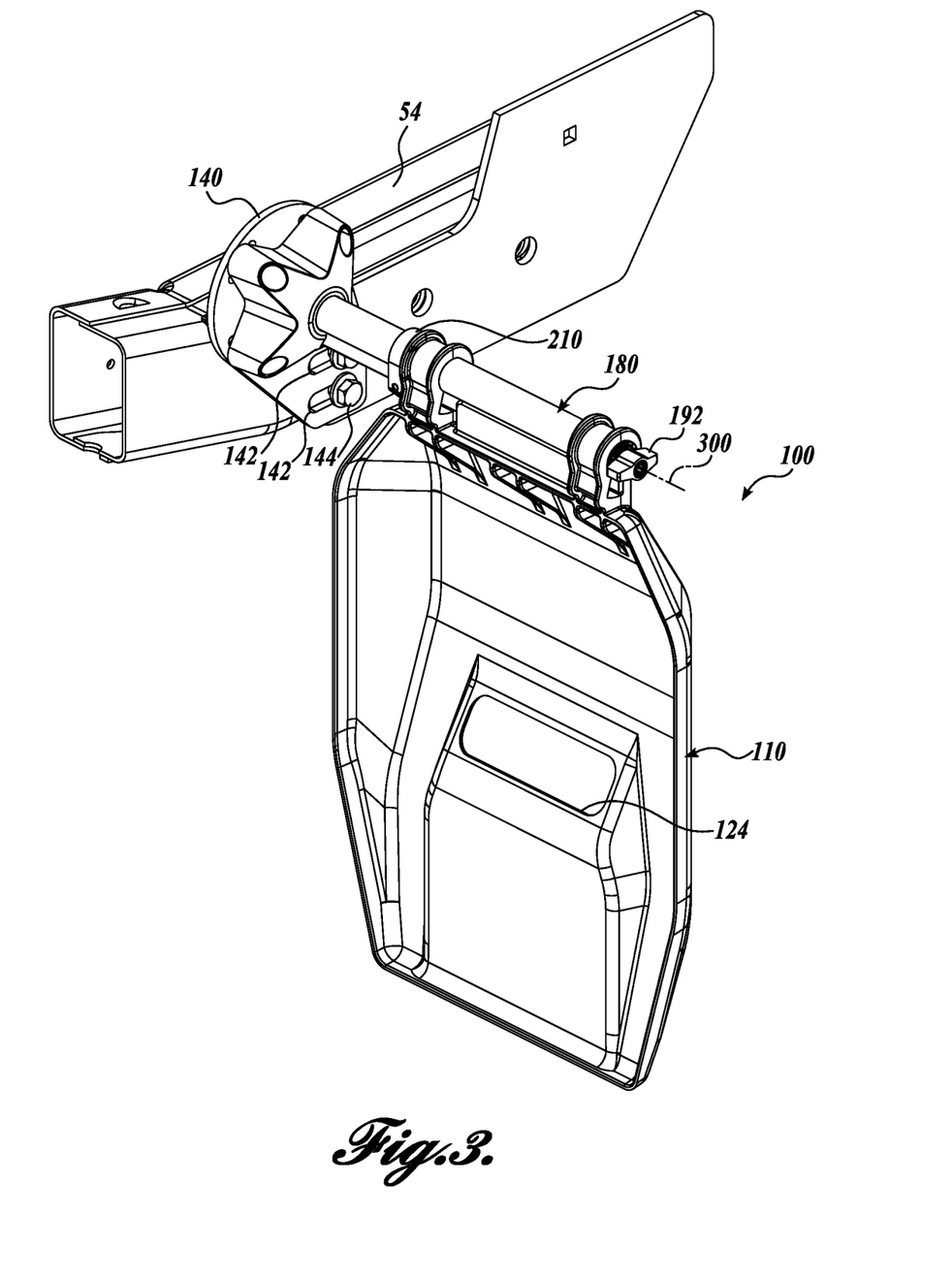
FIG. 3 shows a top front isometric view if the mud flap assembly of FIG. 1.
Figure 4:
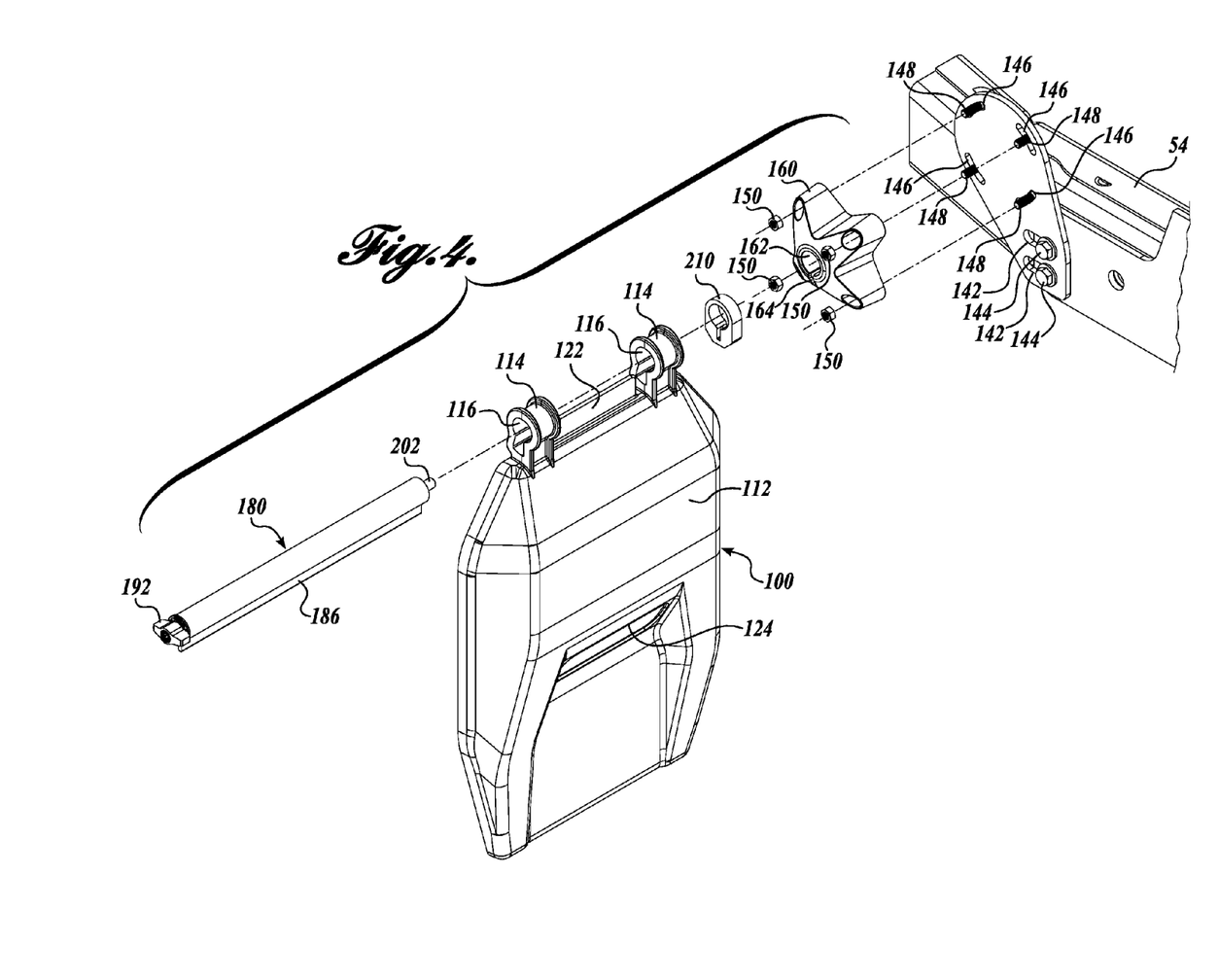
FIG. 4 shows a partially exploded top rear isometric view of the mud flap assembly of FIG. 1.

Referring now to FIGS. 2-4, the mud flap assembly 100 includes a mounting bracket 140 coupled to the frame 54 of the vehicle 50. In the illustrated embodiment, the bracket 140 is a flat bracket formed from a material having suitable strength and durability. A pair of generally parallel horizontal slots 142 is formed in the bracket 140, and a fastener 144 extends horizontally through each of the slots to secure the bracket to the frame 54. The inclusion of slots 144 allows for the adjustment of the position of bracket 140 in the forward/aft direction. That is, the fasteners 144 can be loosened to allow the bracket 140 to be moved forward or aft, as necessary, and then tightened to secure the position of the bracket relative to the frame 54.

A mount 160 is coupled to the bracket 140 by a plurality of fasteners. As shown in FIG. 4, the illustrated embodiment includes a plurality of arcuate slots 146 with a common axis formed in the mounting bracket 140. Each slot 146 corresponds to an aperture in the mount 160 so that the mount can be secured to the bracket 140 with a fastener extending through the slot and the corresponding aperture in the mount. In the illustrated embodiment, the fastener is a bolt 148 and nut 150 in combination; however, it will be appreciated that any suitable fastener or combination of known fasteners can be utilized.

As will be described in further detail, a rod assembly 180 is coupled to the mount 160 and supports the mud flap 110. The mounting bracket 140 and the mount 160 cooperate to position a rod assembly 180, and, therefore, the mud flap 110. The slotted configuration of the mounting bracket 140 allows for adjustment of the mud flap 110 in the forward and aft directions. Alternate embodiments are contemplated in which the slots are not horizontal, but are instead vertical or angled, allowing for adjustment in the vertical direction alone or in combination with the horizontal direction. In this regard, the mounting bracket 140 can have any suitable configuration to provide for necessary adjustment of the position of the rod assembly 180. Moreover, the mounting bracket 140 can be configured for use on a specific vehicle, allowing the remaining components of the mud flap assembly 100 to be "universal," i.e., specific vehicle requirements can be accounted for by the mounting bracket 140.

The rod assembly 180 that supports the mud flap 110 is secured to the mount 160 so that rotation of the rod assembly relative to the mount is prevented. The slotted configuration of the mounting bracket 140 allows the mount to be rotated about the axis of the mounting bracket slots 146. By selectively positioning the mount 160 relative to the mounting bracket 140, an installer also selectively positions the rod assembly 180 and, therefore, the mud flap 110 relative to the frame 54 and, therefore, the tire 56.

It will be appreciated that the disclosed mounting bracket 140 and mount 160 are exemplary only and should not be considered limiting. In this regard, any suitable configuration for mounting the rod assembly 180 to the vehicle 50 can be utilized and such configurations should be considered within the scope of the present disclosure.

Figure 5:
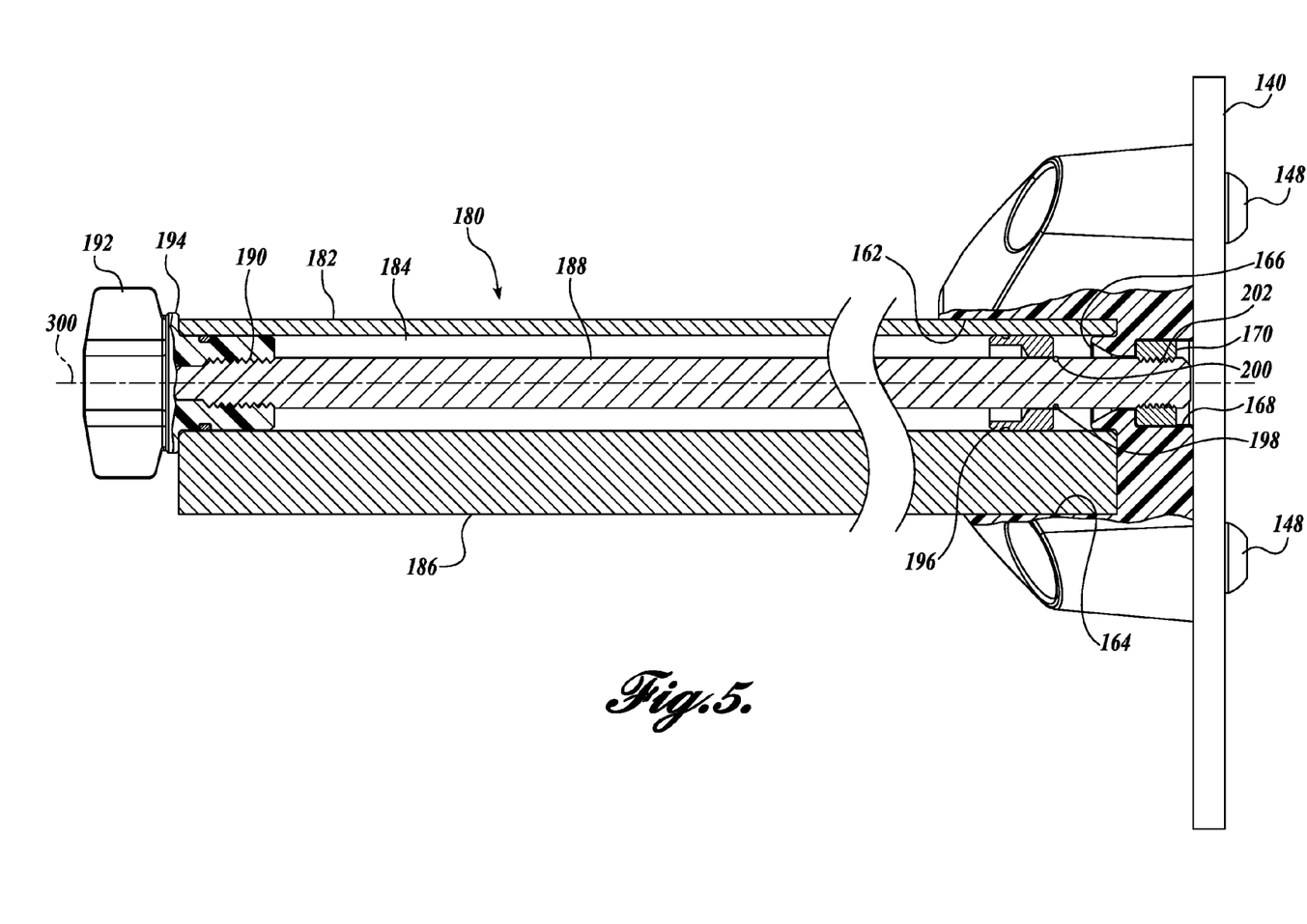
FIG. 5 shows a cross-sectional view of a rod assembly of the mud flap assembly of FIG. 1.

As best shown in FIGS. 4 and 5, the rod assembly 180 includes an elongate housing 182 with a cavity 184 extending along the length of the housing. In the illustrated embodiment, the housing 184 is formed form a metal extrusion, preferably aluminum, but it will be appreciated that the housing can be formed from any suitable material by any known manufacturing methods. The exterior surface of the housing 184 is generally a cylinder with a central axis 300. The housing 180 has a stop 186 in the shape of a radial fin extending outwardly along the length of the housing. In the illustrated embodiment, the cavity 184 is generally cylindrical, and the outer surface of the housing 180 is cylindrical except for the rectangular stop 186. It will be understood that the housing and the features thereof are exemplary only, and are not limited to the disclosed forms.

A rod 188 is disposed within the cavity 184 of the housing 182. One end of the rod 188 has a threaded portion 190 that threadedly engages a knob 192 disposed at one end of the housing 182. The knob 192 is sized and configured to be rotated by hand by an operator to allow installation and removal of the mud flap assembly 100 without the need for tools; however, alternate embodiments are contemplated in which the know is adapted to engage a tool, such as a wrench, a screwdriver, or any other tools suitable for applying an installation torque to the rod 188. The knob 192 has a shoulder 194 that engages the end of the housing 182 to prevent movement of the rod relative to the housing in a first direction.

A second end of the rod 188 has a threaded portion 202 that extends beyond the housing. As best shown in FIG. 5, disposed within the housing proximate to the threaded portion 202 is an annular stop 196 surrounding the rod 188. The stop 196 is fixedly secured within the housing 182 by a press fit or other suitable means, such as a set screw, retaining rings, etc. Alternate embodiments are also contemplated wherein the annular stop 196 is integrally formed with the housing 182, or wherein the stop is not an annular ring, but is instead has another form, such as one or more projections extending radially inward, or any other suitable shape.

A retaining ring 198 is partially disposed within a circumferential groove 200 formed in the second end 188 of the rod 188 proximate to the stop 196. The retaining ring 198 engages the stop 196 to limit movement of the rod 188 relative to the stop 196 and, therefore, of the rod relative to the housing 182. Thus, the movement of the rod 188 relative to the housing 182 is limited (1) in a first direction by the engagement of the shoulder 194 of the knob 192 with the end of the housing 182, and (2) in a second direction by the engagement of the retaining ring 198 with the annular stop 196

A cylindrical recess 162 and an elongate slot 164 are formed in the mount 160 and are sized and configured to receive the cylindrical portion of the housing 182 and the stop 186, respectively. As best shown in FIG. 5, a boss 166 is formed in the recess and is sized and configured to engage the end of the cavity 184 of the housing. A second recess 168 is formed in the mount 160 opposite the first recess 162, and a nut 170 is positioned within the recess. When the mount 160 secured to the mounting bracket 140, the nut 170 is captured within the recess 168.

To secure the rod assembly 180 to the mount 160, the end of the housing 182 is inserted into the recess 162 and slot 164 of the mount. The threaded portion 190 of the rod, which is supported and guided by the annular stop 196, extends through the mount to engage the captured nut 170. The knob 192 is rotated to threadedly couple the rod 188 to the captured nut and, therefore, the mount 160.

When the rod assembly 180 is coupled to the mount 160, the housing 182 in captured between the shoulder 194 of the knob 192 and the bottom of the recess 162 formed in the mount 160. The engagement of the boss 166 with the cavity 184 in the housing 182 further secures the housing 182 to the mount 160, and the stop 186 engages the slot 164 to prevent the housing 182 from rotating relative to the mount.

To remove the rod assembly, and therefore the mud flap 110, the knob 192 is rotated to turn the rod 188 such that the threaded portion 202 decouples with the captured nut 170 of the mount 170. As the rod 188 is turned to disengage the nut 170, the rod 188 moves away from the mount 170, driven by the engagement of the threaded portion 202 of the rod with the threads of the nut 170. Movement of the rod 188 away from the mount 160 also moves the retaining ring 198 away from the mount. As the retaining ring 198 moves away from the mount 160, the retaining ring engages the annular stop 196 and applies a force to the stop that drive the stop away from the mount, which in turn drives the housing 182 away from the nut 170 to help disengage the housing from the mount. It will be noted that that in the event that the housing 182 is wedged in the mount 160 or covered with ice or mud, the disclosed configuration provides additional forces to assist in disengaging the rod assembly 180 from the mount 160.

Figure 6:
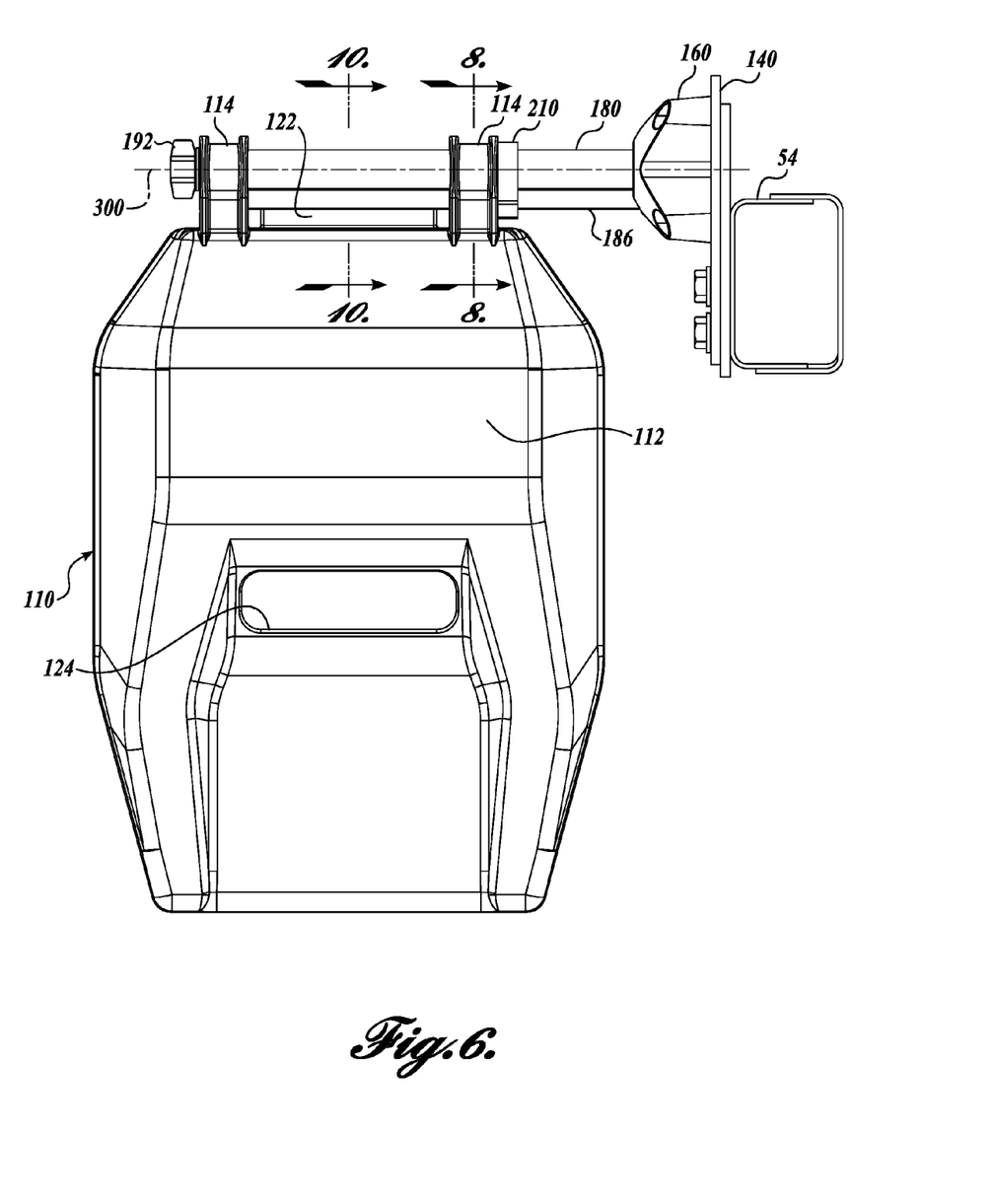
FIG. 6 shows a rear view if the mud flap assembly of FIG. 1.
Figure 7:
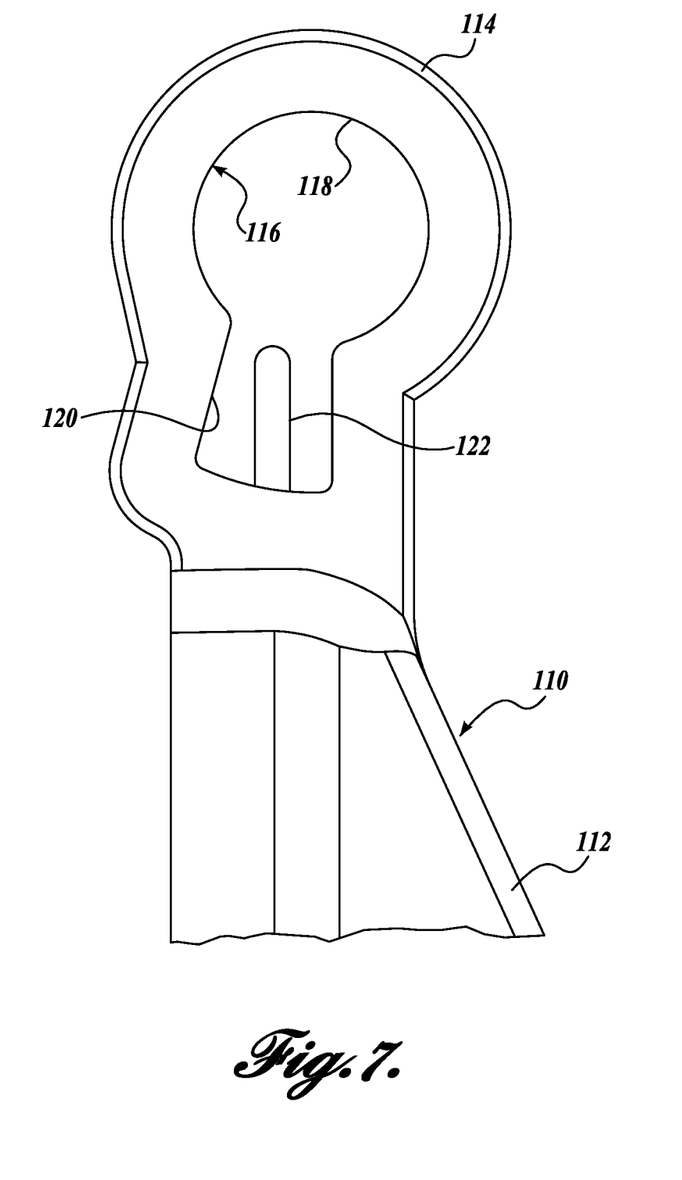
FIG. 7 shows a partial cross-sectional view of a mud flap of the mud flap assembly of FIG. 6.

Referring now to FIGS. 6 and 7, the mud flap 110 has a body 112 with a pair of lugs 114 positioned coaxially along a top end of the body. Referring to FIG. 7, a keyway 116 is formed in each lug 114. Each keyway 116 has a generally cylindrical first portion 118 sized and configured to receive the cylindrical outer surface of the housing 182 of the rod assembly 180. A second wedge-shaped portion 120 is positioned below the first portion and is sized and configured to receive the stop 186 of the housing 182 of the rod assembly 180.

The mud flap 110 is mounted to the rod assembly by inserting the rod assembly 180 through the keyway 116 of each lug. The round portion 118 of the keyway 116 receives the housing 182 of the rod assembly 180, and the wedge-shaped portion 120 receives the stop 186 of the rod assembly 180. A retainer 210 is disposed on the rod assembly 180 to limit movement of the mud flap 110 relative to the rod assembly. In this regard, when the mud flap 110 is mounted to the rod assembly 180, the mud flap is positioned between the knob 192 and the retainer 210 so that the knob and the retainer cooperate to position the mud flap in the preferred position.

Figure 8:
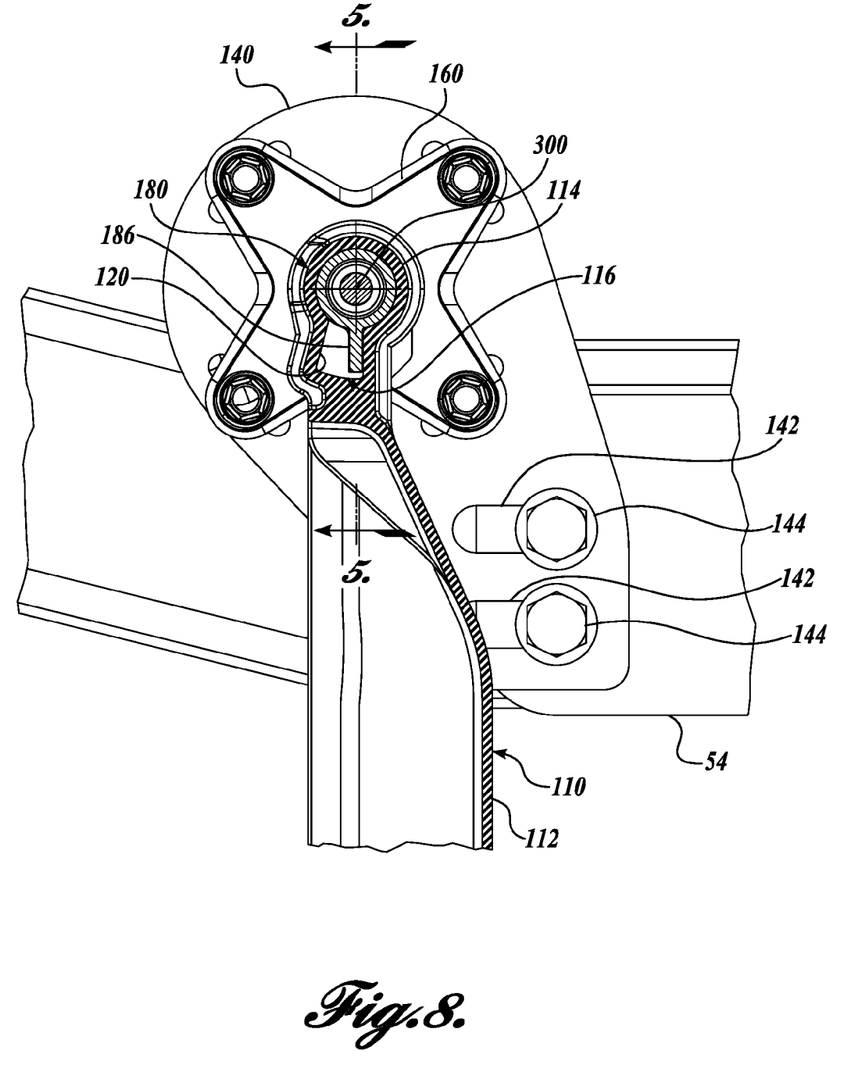
FIG. 8 shows a partial cross-sectional view of the mud flap assembly of FIG. 6 with the mud flap in a first position.
Figure 9:
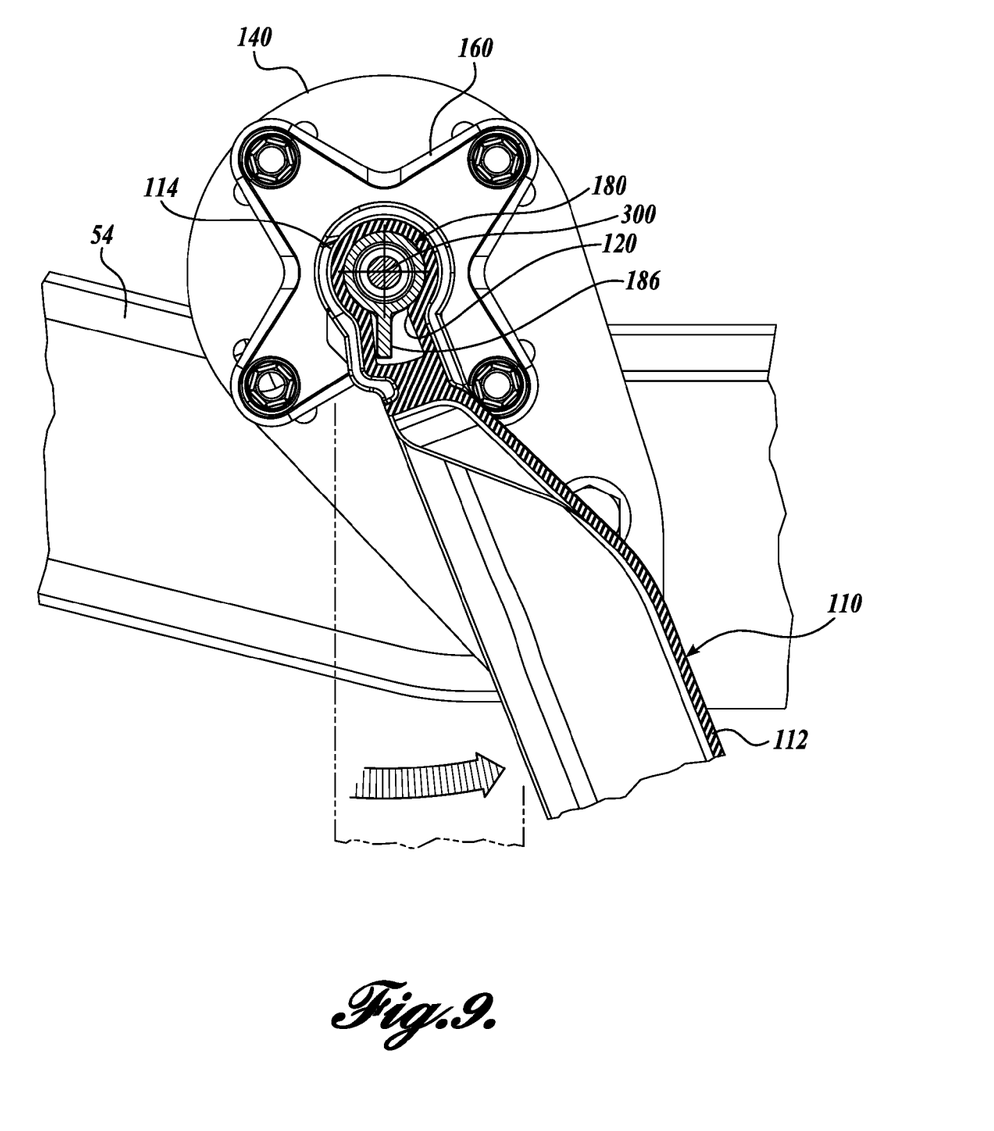
FIG. 9 shows a partial cross-sectional view of the mud flap assembly of FIG. 6 with the mud flap in a second position.

Referring now to FIGS. 8 and 9, the keyways 116 of the mud flap 110 engage the rod assembly 180 to allow limited rotation of the mud flap about axis 300 of the rod assembly 180. Specifically, the first portion 118 of the keyway 116 engages the housing 182 of the rod assembly 180 to rotatably support the mud flap 110. When the mud flap 110 is in a first position, shown in FIG. 8, the stop 186 engages a rear wall of the second portion 120 of the keyway 116 to prevent the mud flap from rotating in a forward direction (clockwise as shown in FIG. 8).

When the mud flap 110 is in a second position, shown in FIG. 9, the stop 186 engages a forward wall of the second portion 120 of the keyway 116 to prevent the mud flap from rotating in a rearward direction (counter-clockwise as shown in FIG. 9). Thus, the rotation of the mud flap 110 is limited to movement between the first and second position.

Figure 10:
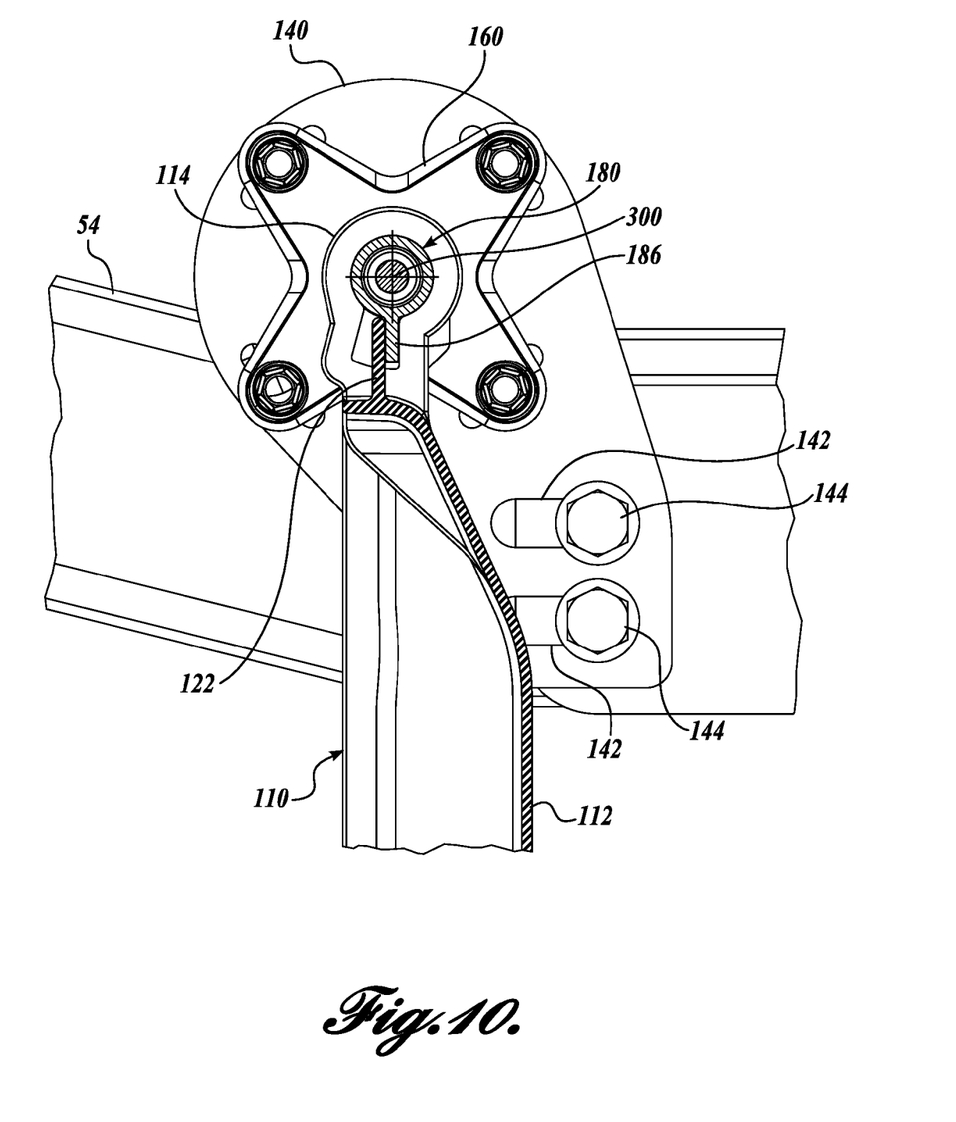
FIG. 10 shows a partial cross-sectional view of a spring tab of the mud flap of FIG. 8.

The mud flap 110 is configured to be biased toward the first position shown in FIG. 8. In the illustrated embodiment, the mud flap 110 includes a biasing element 122 in the form of a resilient tab extending up from the top of the mud flap body 112. As shown in FIG. 10, the biasing element 122 engages the stop 186 of the rod assembly 180. As the mud flap 110 is rotated about axis 300 toward the second position (counter-clockwise in FIG. 10), biasing element 122 engages the stop 186 so that the stop is deflected. This deflection, in turn, results in a force that tends to rotate the mud flap 110 about axis 300 toward the first position.

In the illustrated embodiment, the biasing element 122 is integrally formed with the body 112 of the mud flap 110 and is formed from a polymeric material with suitable properties to have a designed spring constant so that the biasing force is within a desired range. It will be appreciated that the biasing element need not be integrally formed with the mud flap body 112 nor be formed of the same material. In addition, embodiments in which the biasing element is disposed on the rod assembly, and a rigid stop is formed on the mid flap 100 are contemplated. Also, embodiments in which different types of springs, such as compression springs, tension springs, torsion springs, and the like, are utilized to provide a biasing element. These and other configurations that provide a force to bias the mud flap 110 to the first position are contemplated and should be considered within the scope of the present disclosure.

When the vehicle is in motion, debris that would otherwise be discharged from the rear of the vehicle strikes the forward surface of the mud flap 110. Mud flap assemblies according to the present disclosure are able to rotate in a rearward when struck by large debris, after which the biasing element 122 returns the mud flap 100 the normal (first) operating position. The ability of the mud flap to move in this manner mitigates potential damage to the mud flap components.

An aperture 124 is formed in the body 112 of the mud flap 110. Because the mud flap 110 of the disclosed mud flap assembly 100 is rotatable when a force applied the mud flap 110 sufficient to overcome the biasing force of the biasing element 122, it is possible that under certain conditions, the mud flap 110 will rotate in a rearward direction in response to air impinging on the forward portion of the mud flap. The aperture 124 reduces the amount of force generated by the airflow impinging on the forward side of the mud flap 110 when the vehicle 50 is in motion. By providing a path for air to flow through the mud flap 110, the aperture 124 reduces the air pressure that builds up on the forward side of the mud flap, thereby helping the mud flap 110 to maintain its normal (first) operating position. It will be appreciated that the illustrated aperture is exemplary only, and the number, location, and shape of apertures formed in the mud flap 110 may vary within the scope of the present disclosure.

While illustrative embodiments have been illustrated and described, it will be appreciated that various changes can be made therein without departing from the spirit and scope of the invention.

The embodiments of the invention in which an exclusive property or privilege is claimed are defined as follows:

1. A mud flap assembly for vehicle, comprising:
   (a) a rod assembly configured to be mounted to the vehicle, the rod assembly comprising an elongate housing with a stop formed thereon; and
   (b) a mud flap, comprising:
      (i) a keyway extending through a portion of the mud flap, a first part of the keyway being sized and configured to rotatably engage the elongate housing, a second part of the keyway engaging the stop to limit rotation of the mud flap between a first position and a second position; and (ii) a biasing element biasing the mud flap toward the first position when the mud flap is in the second position.

2. The mud flap assembly of claim 1, wherein the stop is a tab extending radially from the housing.

3. The mud flap assembly of claim 2, wherein the tab engages a first face of the second part of the keyway when the mud flap is in the first position, and the tab engages a second face of the second part of the keyway when the mud flap is in the second position.

4. The mud flap assembly of claim 2, wherein at least a portion of the elongate housing has a cylindrical outer surface engaging the first part of the keyway.

5. The mud flap assembly of claim 2, wherein the biasing element is a second tab extending from the mud flap, and movement of the mud flap from the first position to the second position deflects the biasing element.

6. The mud flap assembly of claim 5, wherein the biasing element comprises a polymeric material.

7. The mud flap assembly of claim 5, wherein the stop engages the biasing element to deflect the biasing element when the mud flap is in the second position.

8. The mud flap assembly of claim 1, wherein the rod assembly further comprises a rod extending through the elongate housing, a first end of the rod having a knob, a second end of the rod being demountably coupled to the vehicle.

9. The mud flap assembly of claim 8, further comprising a retainer coupled to the rod assembly, the movement of the mud flap along housing being limited in a first direction by the retainer.

10. The mud flap assembly of claim 9, wherein movement of the mudflap along the housing in a second direction is limited by the knob.

11. The mud flap assembly of claim 8, wherein the second end of the rod is threadedly coupled to a mount secured to a frame of the vehicle.

12. The mud flap assembly of claim 11, wherein the rod assembly further comprises a retainer coupled to the rod, the rotation of the rod to decouple the rod from the mount moving the retainer to apply a force to drive the elongate housing away from the mount.

13. The mud flap assembly of claim 11, wherein mount is adapted to selectively adjust a position of the rod assembly relative to the frame.

14. The mud flap assembly of claim 1, wherein the mud flap comprises an aperture formed therein, the aperture being sized and configured to reduce a force applied to the mud flap by an air flow when the vehicle is moving.

15. A mud flap assembly for vehicle, comprising:
  (a) a mount coupled to the vehicle, the position of the mount being adjustable;
  (b) a rod assembly demountably couplable to the mount, the rod assembly having a cylindrical housing with a stop extending radially from an outer surface of the housing; and
  (c) a mud flap rotatably mounted to the rod assembly, the mud flap, comprising:
    (i) a keyway extending through a portion of the mud flap, a first part of the keyway being sized and configured to receive the housing of the rod assembly, a second part of the keyway limiting rotation of the mud flap; and
    (ii) a biasing element biasing the mud flap toward a first position.

16. The mud flap assembly of claim 15, the mud flap comprising an aperture sized and configured to allow a flow of air through the mud flap.

17. The mud flap assembly of claim 16, the second part of the keyway limiting rotation of the mud flap between the first position and a second position.

18. The mud flap assembly of claim 16, wherein the rod assembly further comprises a rod extending through the elongate housing, a first end of the rod having a knob configured to allow selective rotation of the rod.

19. The mud flap assembly of claim 18, a second end of the rod being threadedly couplable to the mount.

20. The mud flap assembly of claim 19, the rod assembly further comprising a retainer, rotation of the rod to decouple the rod from the mount moving the retainer to apply a force to drive the elongate housing away from the mount.

\* \* \* \* \*

UNITED STATES PATENT AND TRADEMARK OFFICE
CERTIFICATE OF CORRECTION

PATENT NO.         : 9,802,652 B1
APPLICATION NO.    : 15/338185
DATED              : October 31, 2017
INVENTOR(S)        : C. P. Cox It is certified that error appears in the above-identified patent and that said Letters Patent is hereby corrected as shown below:

On the Title Page

| Item (57) | Abstract | "includes biasing" should read --includes a biasing-- |
| Column 2 | 10 | |

In the Claims

Column

| 6 | 57 | "for vehicle" should read --for a vehicle-- |
| (Claim 1, Line 1) | | |

| 7 | 33 | "the mudflap" should read --the mud flap-- |
| (Claim 10, Line 2) | | |

| 8 | 1 | "wherein mount" should read --wherein the mount-- |
| (Claim 13, Line 1) | | |

| 8 | 8 | "for vehicle" should read --for a vehicle-- |
| (Claim 15, Line 1) | | |

Signed and Sealed this
Sixth Day of March, 2018

Andrei Iancu
*Director of the United States Patent and Trademark Office*